(12) United States Patent
Amendolea

(10) Patent No.: US 12,031,561 B2
(45) Date of Patent: Jul. 9, 2024

(54) HIGH LOAD TOGGLE BOLT HOLLOW WALL ANCHOR, LOAD DISPERSING TOGGLE MEMBER ADAPTOR AND METHOD FOR IMPLEMENTING THE SAME

(71) Applicant: Rick Amendolea, Columbiana, PA (US)

(72) Inventor: Rick Amendolea, Columbiana, PA (US)

( * ) Notice: Subject to any disclaimer, the term of this patent is extended or adjusted under 35 U.S.C. 154(b) by 429 days.

(21) Appl. No.: 17/173,029

(22) Filed: Feb. 10, 2021

(65) Prior Publication Data

US 2021/0246926 A1 Aug. 12, 2021

Related U.S. Application Data

(60) Provisional application No. 62/972,230, filed on Feb. 10, 2020.

(51) Int. Cl.
*F16B 21/00* (2006.01)
*F16B 13/08* (2006.01)

(52) U.S. Cl.
CPC ................ *F16B 13/0808* (2013.01)

(58) Field of Classification Search
CPC .................................... F16B 13/0808
USPC ........................................ 411/340
See application file for complete search history.

(56) References Cited

U.S. PATENT DOCUMENTS

| | | |
|---|---|---|
| 1,521,025 A | 12/1923 | Habener |
| 1,506,123 A | 8/1924 | Habener |
| 2,439,364 A * | 4/1948 | King ............... F16B 13/0808 411/345 |
| 2,998,743 A | 9/1961 | Apfelzweig |
| 3,211,042 A | 10/1965 | Fischer |
| 3,605,547 A | 9/1971 | Millet |
| 4,075,924 A | 2/1978 | McSherry et al. |
| 4,294,156 A | 10/1981 | McSherry et al. |
| 4,650,386 A * | 3/1987 | McSherry ........ F16B 13/0808 411/340 |
| 6,161,999 A * | 12/2000 | Kaye ............... F16B 13/0808 411/344 |
| 6,679,664 B2 * | 1/2004 | Ikuta .............. F16B 13/0808 411/427 |
| 10,487,865 B2 * | 11/2019 | Daly .............. F16B 13/0808 |
| 10,927,872 B2 * | 2/2021 | Wakai ............. F16B 13/0808 |

(Continued)

OTHER PUBLICATIONS

I. Church, Anchor Bolt, U.S. Pat. No. 860,636, Issued Jul. 23, 1907, U.S. Application 299444, filed Feb. 5, 1906. This form would not permit the entry of this patent No. in the U.S.Patents field.

*Primary Examiner* — Gary W Estremsky
(74) *Attorney, Agent, or Firm* — Blynn L. Shideler; Krisanne Shideler; BLK Law Group

(57) ABSTRACT

A high load toggle bolt hollow wall anchor comprises a bolt and a two piece toggle member, wherein the first piece of the two piece toggle member is an elongated member with a threaded opening for receiving the bolt, and wherein a second piece of the two piece toggle member is a load plate having i) a planar wall engaging face, ii) a wall opening engaging ridge extending from the wall engaging face, and iii) a groove in a rear of the load plate configured to receive and to hold the elongated member therein. The load plate provides a load dispersing toggle member adaptor. A method of implementation is also disclosed.

10 Claims, 4 Drawing Sheets

(56) References Cited

U.S. PATENT DOCUMENTS

| | | | | |
|---|---|---|---|---|
| 2004/0109741 A1* | 6/2004 | Bavaro | ............... | F16B 13/0808 |
| | | | | 411/341 |
| 2008/0253860 A1* | 10/2008 | McDuff | ................ | F16B 13/003 |
| | | | | 411/340 |
| 2009/0208310 A1* | 8/2009 | Ikuta | ................... | F16B 13/0808 |
| | | | | 411/344 |
| 2011/0268528 A1* | 11/2011 | Gaudron | ............ | F16B 13/0808 |
| | | | | 411/44 |
| 2011/0271635 A1* | 11/2011 | Kearl | ................... | F16B 37/044 |
| | | | | 52/705 |
| 2012/0045292 A1* | 2/2012 | Kaye | ................... | F16B 13/0808 |
| | | | | 411/15 |
| 2012/0328392 A1* | 12/2012 | Difante | ............... | F16B 13/0808 |
| | | | | 411/342 |
| 2014/0010617 A1* | 1/2014 | Luke | ................... | F16B 13/0808 |
| | | | | 411/340 |
| 2018/0372139 A1* | 12/2018 | Daly | ................... | F16B 13/0808 |
| 2019/0107136 A1* | 4/2019 | Daly | ................... | F16B 13/0808 |
| 2019/0331147 A1* | 10/2019 | McDuff | ................ | F16B 13/002 |

* cited by examiner

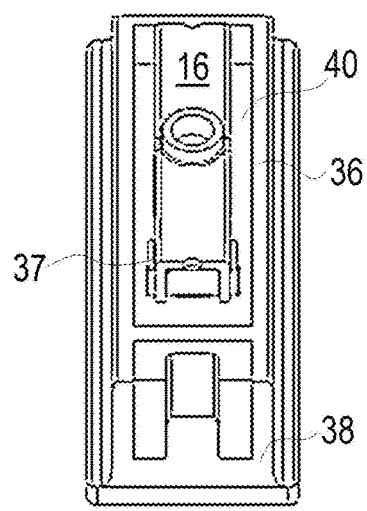
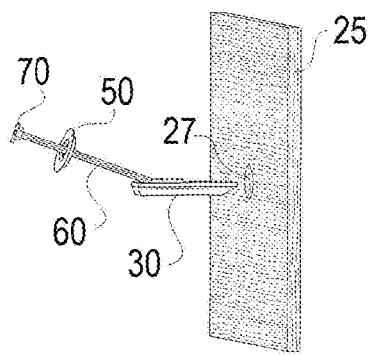
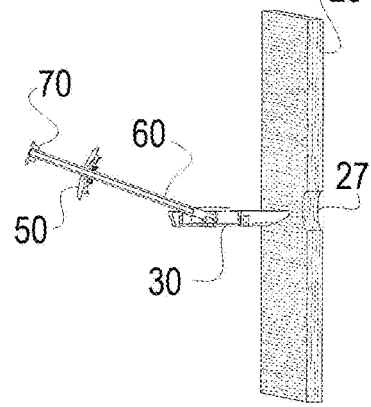
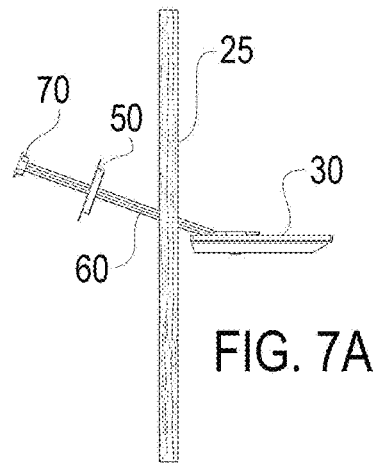
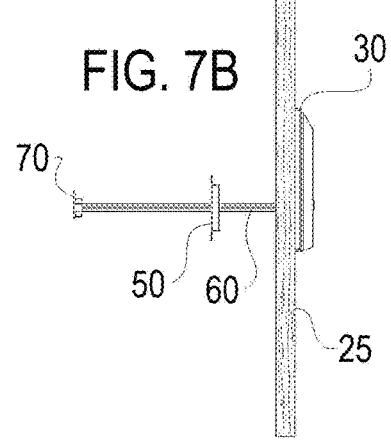
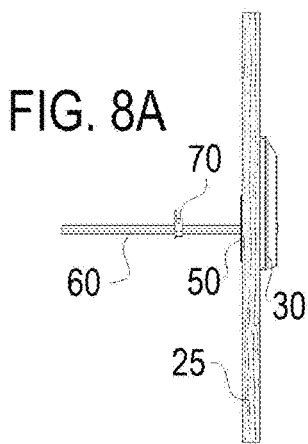
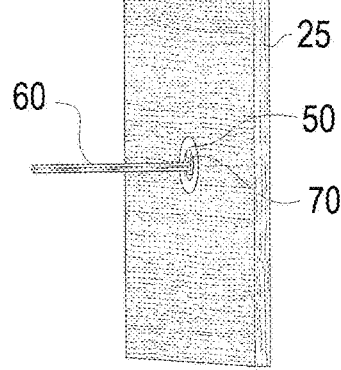
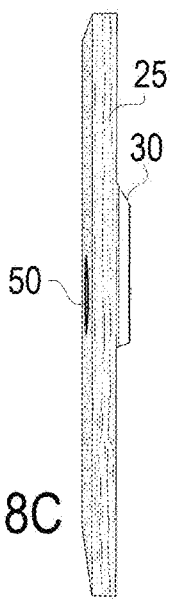

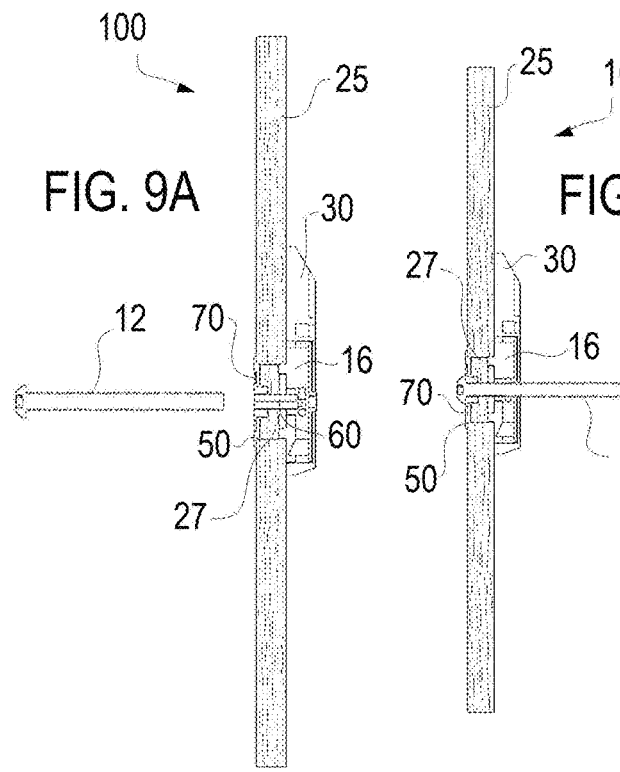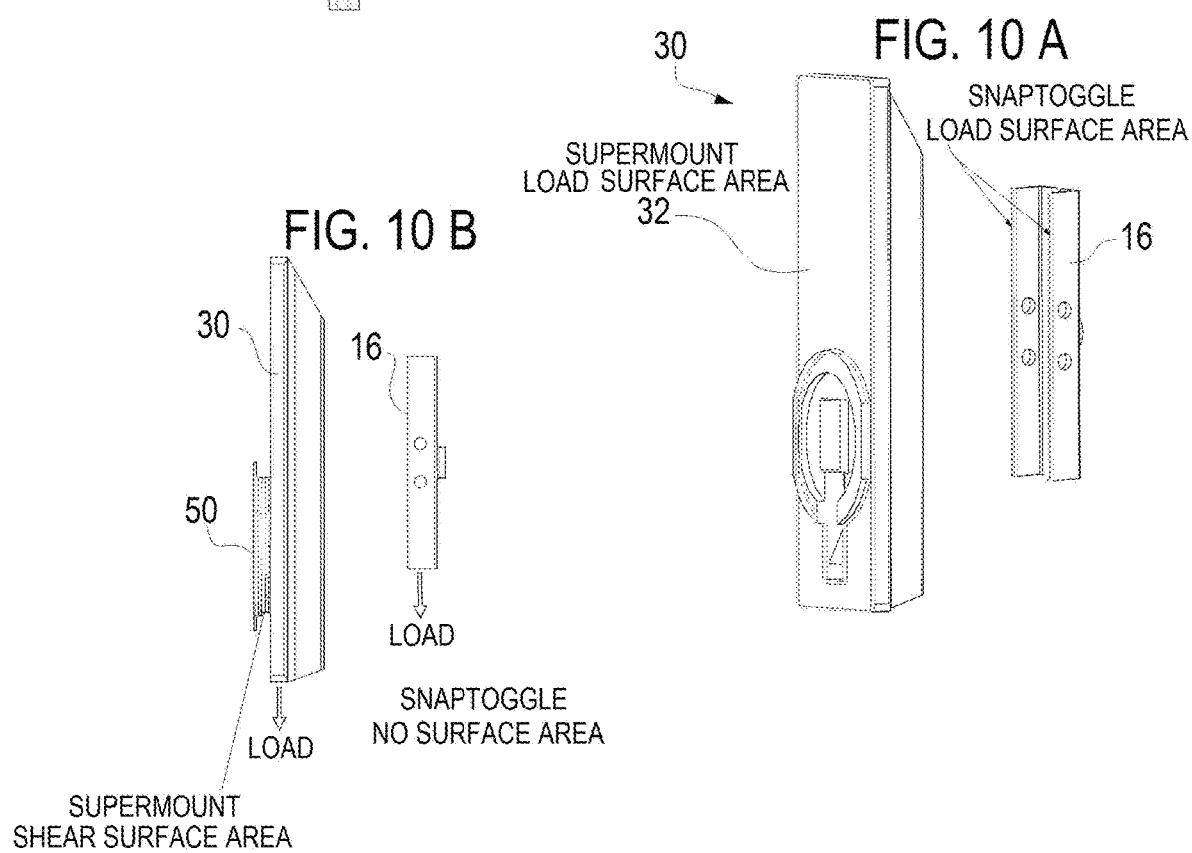

HIGH LOAD TOGGLE BOLT HOLLOW WALL ANCHOR, LOAD DISPERSING TOGGLE MEMBER ADAPTOR AND METHOD FOR IMPLEMENTING THE SAME

RELATED APPLICATIONS

This application claims the benefit of U.S. Provisional Patent Application Ser. No. 62/972,230, filed Feb. 10, 2020 titled "High Load Toggle Bolt Hollow Wall Anchor, Load Dispersing Toggle Member Adaptor and Method for Implementing the Same" which application is incorporated herein by reference in its entirety.

BACKGROUND OF THE INVENTION

1. Field of the Invention

This invention generally relates to toggle bolt hollow wall anchors, load dispersing toggle member adaptors and methods for implementing the same.

2. Background Information

Toggle bolts are a traditional hollow wall anchor devices that generally consist of two parts once deployed, a toggle member 14 and a bolt 12. Toggle bolts are generally sized by the diameter of the bolt 12 and the bolt length. Toggle bolts have been the preferred hollow wall anchor solution for heavy items. Toggle bolts require a pilot or access hole, and the toggle member 14 includes wings that are secured into place behind the hollow wall to provide strong holding power. FIG. 1 shows conventionally available toggle bolts used in the industry.

The majority of existing commercial toggle bolts can be categorized as "fixed" wing toggle bolts or as butterfly wing toggle bolts. In fixed wing toggle bolts, the wings of the toggle member 14 are formed by an elongated "fixed" structure forming the toggle member 14, generally a metal channel 16, wherein the fixed wing toggle member 14 generally pivots about a pivot point about midway along the fixed wing member from an insertion position generally aligned with the bolt 12 to a deployed position generally perpendicular to the bolt 12 and parallel to the wall after insertion. With a common two arm applicator 18 discussed below, the fixed wing toggle member 14, specifically a channel 16, forms part of a linkage assembly that moves from the insertion position to the deployed position via two pivot points on the end of the linkage arms 18, and does not technically have a single pivot axis. Yet the description of a pivot point generally where the bolt 12 is coupled to the toggle member 14 is generally conceptually accurate.

In a general butterfly wing toggle bolt design, the toggle member 14 includes two wing halves which are pivoted together, or to a separate intervening base, and both pivot relative to each other, and pivot relative to the bolt 12. Like the fixed wing member, each butterfly wing half pivots from an insertion position generally aligned with the bolt 12 to a deployed position generally perpendicular to the bolt 12 and parallel to the wall 25 after insertion, however the wing halves pivot in opposite directions during deployment, and pivot about a pivot point generally near an end of each wing half. Modifications of the butterfly toggle bolt can include three or four separate pivoted wing portions that spring out and the functional capabilities thereof begin to merge with what is known as a deformable wall anchor. The operational limits of the butterfly wing toggle designs can be defined by the pivot point connection and can limit the heavy duty application.

The present invention is primarily directed to fixed wing toggle bolts, which have a long history of use. The patent literature confirms this long history in, for example, the following patents going back over a century: a 1907 U.S. Pat. No. 860,636, 1924 U.S. Pat. Nos. 1,506,123 and 1,521,025, a 1961 U.S. Pat. No. 2,998,743, a 1965 U.S. Pat. No. 3,211,042, and a 1971 U.S. Pat. No. 3,605,547, which patents are incorporated herein by reference.

In commercially available fixed wing toggle bolts it is common to have a separate dual arm applicator having arms 18 and handle 20 used for insertion and manipulation of the fixed wing toggle member 16 from the inserted position to the deployed position. The insertion and movement to the deployed position with the dual arm applicator (18 and 20) is generally accomplished without the presence of the bolt 12.

This conventional fixed wing toggle bolt applicator with the handle 20 and arms 18 arrangement is shown in FIGS. 2A and 2B. Additionally this type of fixed wing toggle bolt device includes a temporary holding or bearing plate 22 that is slid down the applicator arms 18 after the toggle member or channel 16 is pivoted into positon and will hold the deployed channel 16 in place while or until the bolt 12 is threaded into a threaded receiving hole within the deployed channel 16, and the applicator arms are removed, generally by snapping off the arms at a breakpoint generally even with the wall. In addition to the illustration of commercially available fixed wing toggle bolt with dual arm applicators of FIGS. 2A and B, the devices are described in further detail in U.S. Pat. Nos. 6,161,999, 4,294,156, and 4,075,924, which patents are incorporated herein by reference.

The fixed wing toggle bolts are popular and have been widely adopted. However in conventional commercially available fixed wing toggle bolts devices the load is concentrated on two thin faces of the bottom of the two legs of the channel 16. High loading on the small channel 16 can causes the channel 16 to dig into the wall 25 and damage the wall 25 and otherwise limit the holding capacity of the toggle bolt in certain applications.

There is a need to improve the operational characteristics and capabilities of toggle bolts.

SUMMARY OF THE INVENTION

The various embodiments and examples of the present invention as presented herein are understood to be illustrative of the present invention and not restrictive thereof and are non-limiting with respect to the scope of the invention. The present invention provides a high load toggle bolt hollow wall anchor, a load dispersing toggle member adaptor and method for implementing the same which yields a low cost, easy to install, high-load capacity toggle bolt hollow wall anchor that provides maximum holding power in hollow walls such as drywall and fiberglass enclosures.

One aspect of the present invention provides a high load toggle bolt hollow wall anchor comprising a bolt and a two piece toggle member, wherein the first piece of the two piece toggle member is an elongated member with a threaded opening for receiving the bolt, and wherein a second piece of the two piece toggle member is a load plate having i) a planar wall engaging face, ii) a wall opening engaging ridge extending from the wall engaging face, and iii) a groove in a rear of the load plate configured to receive and to hold the elongated member therein.

One aspect of the present invention provides a load dispersing toggle member adaptor comprising a one piece load plate having i) a planar wall engaging face, ii) a wall opening engaging ridge extending from the wall engaging face, and iii) a groove in a rear of the load plate configured to receive and to hold an elongated toggle member therein.

One aspect of the invention provides a method of implementing a high load toggle bolt hollow wall anchor comprising the steps of A) Providing a bolt, a two piece toggle member, a cap flange and a cap, wherein the first piece of the two piece toggle member is an elongated member with a threaded opening for receiving the bolt, and wherein a second piece of the two piece toggle member is a one piece load plate having i) a planar wall engaging face on a front of the load plate, ii) a wall opening engaging ridge extending forwardly from the wall engaging face, and iii) a groove in a rear of the load plate configured to receive and to hold the elongated member therein;
B) Placing the elongated member in the groove;
C) Drilling a hole in the substrate or wall;
D) Sliding the load plate through the hole;
E) Orientating the load plate to rest flush behind the substrate or wall;
F) Orientating the cap flange flush with the substrate or wall;
G) Placing the cap flush with the cap flange; and
H) Threading the bolt to the threaded opening of the elongate member.

These and other advantages of the present invention are described below in connection with the attached figures in which like reference numerals represent like elements throughout.

BRIEF DESCRIPTION OF THE FIGURES

FIG. 5 is a schematic rear perspective view of the seating of a channel toggle member in a channel receiving groove in the load plate for forming a high load toggle bolt hollow wall anchor according to one embodiment of the present invention;

FIGS. 6A and 6B are schematic perspective views, with 6B partially in section, of the initial insertion of the high load toggle bolt hollow wall anchor according to one embodiment of the present invention through a wall opening;

FIGS. 7A and 7B are a schematic views of the deployment of the load plate of the high load toggle bolt hollow wall anchor according to one embodiment of the present invention;

FIGS. 8A-8C are a schematic views of cap flange deployment of the high load toggle bolt hollow wall anchor according to one embodiment of the present invention and the removal of application arms;

FIGS. 9A and 9B are a schematic views of the bolt attachment of the high load toggle bolt hollow wall anchor according to one embodiment of the present invention;

FIGS. 10A and 10B are a schematic illustrations of the pull-out load surface area and the shear surface area of the present invention compared with not using the load plate;

BRIEF DESCRIPTION OF THE PREFERRED EMBODIMENTS

Figure 1:
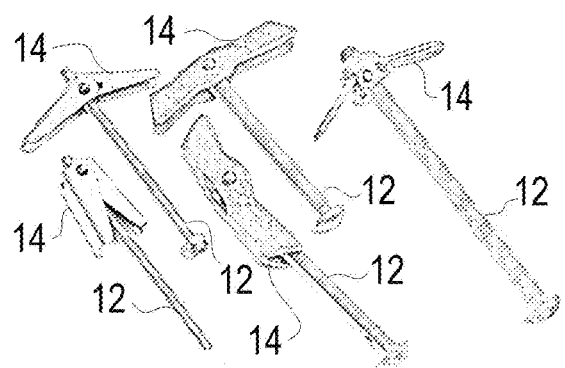
FIG. 1 illustrates several common conventional prior art fixed wing and butterfly wing toggle bolts.

The present invention provides a high load toggle bolt hollow wall anchor 100, a load dispersing toggle member adaptor comprising a load plate 30 and a cap flange 50 and method for implementing the same which yields a low cost, easy to install, high-load capacity toggle bolt hollow wall anchor 100 that provides maximum holding power in hollow walls 25 such as drywall and fiberglass enclosures. The term "about" will define+/−10% within the meaning of this application unless otherwise specified.

As described below, one aspect of the present invention provides a high load toggle bolt hollow wall anchor 100 comprising a bolt 12 and a two piece toggle member, wherein the first piece of the two piece toggle member is an elongated member, namely a metal channel toggle member 16 with a threaded opening for receiving the bolt 12, and wherein a second piece of the two piece toggle member is a load plate 30 having i) a planar wall engaging face 32 on a front of the load plate, ii) a wall opening engaging ridge 34 extending forwardly from the wall engaging face, and iii) a groove 40 in a rear of the load plate 30 configured to receive and to hold the elongated member or channel 16 therein.

Figure 2A:
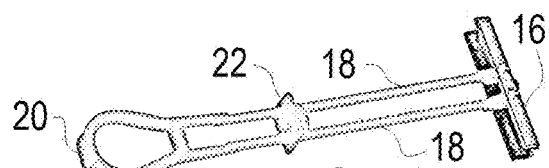
FIGS. 2A and 2B illustrate a common commercially available prior art fixed wing toggle bolts using separate dual arm applicators.
Figure 2B:
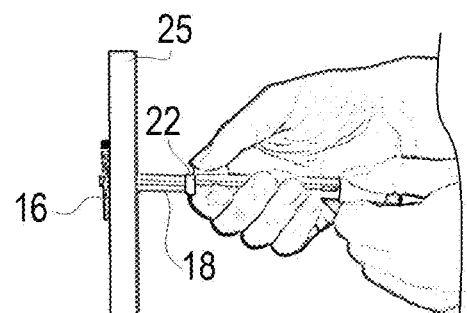

The high load toggle bolt hollow wall anchor 100 according to the invention utilizes a commercially available fixed wing toggle bolt, such as SNAPTOGGLE™ and STRAPTOGGLE™ brand fixed wing toggle bolt as shown in FIGS. 2A and 2B above incorporating a channel 16 and handles 60, a high capacity load dispersing toggle member adaptor comprising a load plate 30 and a cap flange 50. The details of the commercially available toggle bolt which uses a metal channel toggle member 16 with threaded bolt receiving opening is well known in the art, is generally outlined above, and need not be discussed in detail. The handles 60 may also be formed as the handles 18 discussed above.

Figure 3:
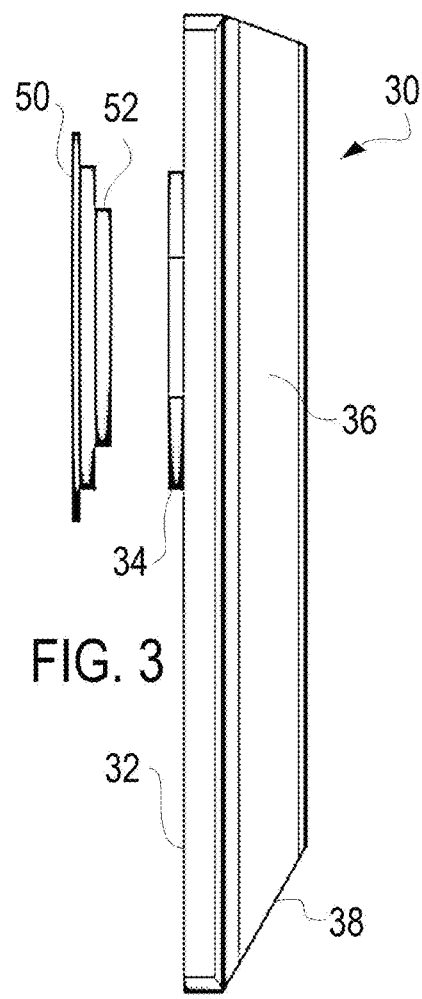
FIG. 3 is an exploded side schematic view of a high capacity load dispersing toggle member adaptor, also referenced as a load plate and cap flange, for forming a high load toggle bolt hollow wall anchor according to one embodiment of the present invention.
Figure 4:
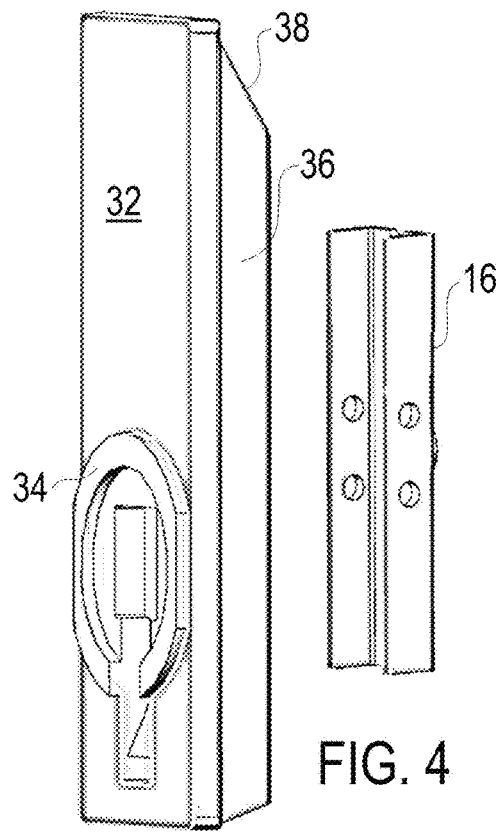
FIG. 4 is schematic perspective view of the load plate of FIG. 3 with a channel toggle member for forming a high load toggle bolt hollow wall anchor according to one embodiment of the present invention.
Figure 11A:
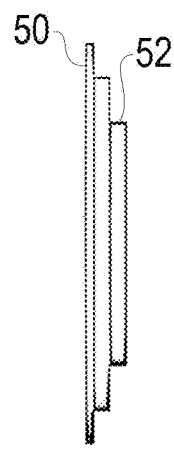
FIGS. 11A and 11B schematically illustrate a side view and a cross-section view, respectively, of a cap flange for a thin substrate of the high load toggle bolt hollow wall anchor according to another embodiment of the present invention.
Figure 11B:
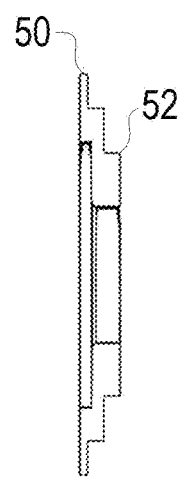
Figure 11C:
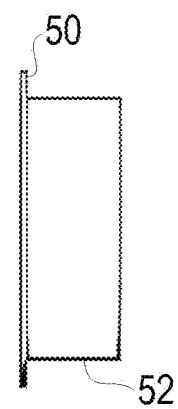
FIGS. 11C and 11D schematically illustrate a side view and a cross-section view, respectively, of a cap flange for a thick substrate of the high load toggle bolt hollow wall anchor according to another embodiment of the present invention
Figure 11D:
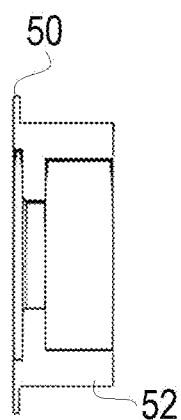

One embodiment of the load plate 30 and a cap flange 50 is shown in FIG. 3. The load plate has a large wall engaging face 32 that is about 1¼" wide and about 3¾" long. Extending from the wall engaging face 32 is a wall opening engaging ridge 34. The rear of the load plate 30 includes a pair of walls 36 defining a channel receiving groove 40 with retaining clips 37 to hold the channel toggle member 16 therein. The load plate includes a T-shaped opening in the channel receiving groove 40 extending through the load plate 30 from the wall engaging face 32. FIG. 4 shows the load plate 30 and channel toggle member 16 of one embodiment of the present invention.

The cap flange 50 has a central opening therein with an extension 52 on one side thereof. In the assembly of the high load toggle bolt hollow wall anchor 100 according to the invention the channel toggle member 16 is slid thru the central opening in the cap flange 50. Next the channel toggle member 16 is inserted thru the T-shaped opening in the load plate 30. Finally, the channel toggle member 16 is seated in the channel receiving groove 40 and engaged by the clips 37 in the load plate 30 resulting in a complete high capacity hollow wall anchor. The channel toggle member 16 being fully seated in the channel receiving groove 40 and engaged by the clips 37 in the load plate 30 is shown in FIG. 5.

Following the assembly of the load plate 50 and channel toggle member 16 of the high load toggle bolt hollow wall anchor 100 according to the invention, the application to the wall 25 is generally similar to existing devices. First a wall opening 27 is formed of about 1¼" in diameter, or about the width of the load plate 30. The wall opening 27 will be larger than that typically used for a conventional toggle bolt having only the channel 16. Then, with the installation of the high load toggle bolt hollow wall anchor 100 according to the invention, the load plate 30 is inserted through the wall opening 27 as shown in FIGS. 6A and 6B. During the insertion through the opening 27, the load plate 30 is somewhat aligned with the application handles 60 as shown and the narrow part of the t-shaped opening in the load plate 30 receives the handles 60 to better accommodate this alignment, whereby the handles 60 are pivoted into the narrow part of the t-shaped opening.

Following insertion of the load plate 30 and channel toggle member 16 through the wall opening 27 in the wall 25, the application handles 60 are operated in a generally conventional fashion to position the load plate 30 against the wall 25 as shown in FIGS. 7A and 7B. In the deployed position of FIG. 7B, the large wall engaging face 32 is adjacent to and engaging the wall 27 and the wall opening engaging ridge 34 is received within the wall opening 27. The upper or leading end 38 of the load plate 30 is beveled to minimize interference during deployment, namely it will provide clearance for pivoting as well as guiding the assembly through the opening 27.

Following the deployment as shown in FIG. 7B, the cap flange 50 is slid down the application arms 60 to an engaged position with the opening 27 followed by a cap 70. The cap 70 is part of the conventional toggle bolt and the cap flange 50 is configured to receive the cap 70 therein.

With the cap 70 and cap flange 50 in the deployed position the application arms 60 or straps are removed, generally snapped off to leave the load plate 30 in position ready to receive the bolt 12 as shown in FIG. 8C

FIGS. 9A and 9B are a schematic views of the bolt 12 attachment of the high load toggle bolt hollow wall anchor 100 according to one embodiment of the present invention wherein the bolt 12 is coupled to the threaded bolt hole in the channel toggle member 16 and the bolt 12 is threaded down to a desired level. The specific device supported on the present invention is not shown but it is well suited for supporting Grab bars, Flat screen TVs, Window treatments, Towel bars, Kitchen accessories, Handrails, ADA hardware, Shelving, Bathroom accessories, Electric boxes, Lighting fixtures, Signs, Partitions, Cabinets, Marine hardware, Speaker mounts, Mirrors, Soap dispensers, Roofs & Decking etc.

In summary following the assembly of the high load toggle bolt hollow wall anchor 100 of the present invention the process is a) Drill a 1¼" diameter hole 27 in the substrate or wall 25;

b) Hold the load plate 30 flat alongside the plastic straps 60 and slide load plate 30 through the hole 27;

c) Hold the ends of the straps 60 between thumb and forefinger and pull them toward the installer until the load plate 30 rests flush behind the wall 25;

d) Slide the plastic cap flange 50 along the straps 60 with the installer's other hand until the cap flange 50 is flush with the wall 25;

e) Slide the cap 70 along the straps 60 until it is flush with the cap flange 50;

f) Snap the straps 60 at the wall 25 by pushing side to side, snapping off the straps 60 level with the cap flange 50 of the cap 70;

g) Place the item to be mounted over the cap flange 50; and h) Insert the appropriate bolt 12 through the item and tighten until the item is flush against the wall 25.

The present invention provides a low cost, easy to install, high-load capacity fastener device that provides maximum holding power in hollow walls such as drywall and fiberglass enclosures. The substrate 25 may be drywall as noted but may also be Cinder block, Concrete block, Gypsum board, Drywall, Tile over drywall, Plasterboard, Composite panels, Cement board, Greenboard, Plaster, Stucco, Fiberglass, Plywood, Steel plate, etc.

The load plate 30 is a one piece molded structure and may be formed out of high strength plastic. The formation of the load plate 30 as separate from the channel toggle member 16 has several advantages. For example, the channel toggle member 16 may be conventionally made of metal for a secure bolt 12 to channel 16 attachment, while the load plate 30 may be effectively plastic. Further, as a two piece assembled structure, the load plate 30 need not always be used in all implementations, in other words, the channel toggle member 16 may be used in a conventional fashion where less holding strength is required, and a smaller wall hole is necessary.

The present invention has been developed under the SUPERMOUNT™ brand and FIGS. 10A and B illustrate the pull-out load surface area and the shear surface area of the present invention compared with the prior art, or not using the load plate 30. The use of the load plate 30 results in a substantially larger pull out load force than the narrow channel faces of not using the load plate 30 as demonstrated in FIG. 10A. This significantly increases the holding strength of the present invention without making installation overly complex or costly. Further, as shown in FIG. 10B the present invention yields shear loading due to the wall opening engaging ridge 52 received within the opening 27. In the prior art, or the invention without using the load plate 50, there is no shear load resistance within the channel 16 itself.

The present invention allows the cap flange 50 to be sized to the substrate or wall thickness as shown in FIGS. 11A-D. FIGS. 11A & 11B, and 11C & 11D, show a side view and cross-section view of a wall flange for a thin substrate and a thick substrate, respectively.

The above description is representative of the present invention but not restrictive thereof. The full scope of the present invention are set forth in the appended claims and equivalents thereto.

What is claimed is:

1. A high load toggle bolt hollow wall anchor comprising: a bolt and a two piece toggle member, wherein the first piece of the two piece toggle member is an elongated channel member with a threaded opening for receiving the bolt, and wherein a second piece of the two piece toggle member is a one piece load plate having i) a planar wall engaging face on a front of the load plate, ii) an arcuate wall opening engaging ridge coupled to and extending forwardly from the wall engaging face, and iii) a groove in a rear of the load plate configured to receive and to hold the elongated channel member therein, wherein a pair of walls defining the groove on a rear of the one piece load plate with the planar wall engaging face spanning between the pair of walls and further including retaining clips on the one piece load plate to engage the elongated channel member; and further including a cap flange having a central opening therein with an extension on one side thereof.

2. The high load toggle bolt hollow wall anchor according to claim 1 further including cap selectively engagable with the cap flange.

3. The high load toggle bolt hollow wall anchor according to claim 1 further including a pair of application handles coupled to the elongated member.

4. The high load toggle bolt hollow wall anchor according to claim 1 wherein a leading end of the load plate is beveled.

5. The high load toggle bolt hollow wall anchor according to claim 1 wherein the load plate is plastic and the elongated member is a metal channel member.

6. The high load toggle bolt hollow wall anchor according to claim 1 wherein the planar wall engaging face is about 1¼" wide and about 3¾" long.

7. A load dispersing toggle member adaptor comprising a one piece load plate having i) a planar wall engaging face on a front of the load plate, ii) an arcuate wall opening engaging ridge coupled to and extending forwardly from the wall engaging face, and iii) a groove in a rear of the load plate configured to receive and to hold an elongated channel therein, wherein a pair of walls defining the groove on a rear of the one piece load plate with the planar wall engaging face spanning between the pair of walls and further including retaining clips on the one piece load plate to engage the elongated channel.

8. The load dispersing toggle member adaptor according to claim 7 wherein a leading end of the load plate is beveled.

9. The load dispersing toggle member adaptor according to claim 7 wherein the load plate is plastic and wherein the planar wall engaging face is about 1¼" wide and about 3¾" long.

10. A method of implementing a high load toggle bolt hollow wall anchor comprising the steps of
A) Providing a bolt, a two piece toggle member, a cap flange and a cap, wherein the first piece of the two piece toggle member is an elongated member with a threaded opening for receiving the bolt, and wherein a second piece of the two piece toggle member is a one piece load plate having i) a planar wall engaging face on a front of the load plate, ii) a wall opening engaging ridge extending forwardly from the wall engaging face, and iii) a groove in a rear of the load plate configured to receive and to hold the elongated member therein;
B) Placing the elongated member in the groove;
C) Drilling a hole in the substrate or wall;
D) Sliding the load plate through the hole;
E) Orientating the load plate to rest flush behind the substrate or wall, including providing a pair of application handles coupled to the elongated member which are used for orientating the load plate to rest flush behind the substrate or wall;
F) Orientating the cap flange flush with the substrate or wall;
G) Placing the cap flush with the cap flange, and further including the step of snapping of portions of the application handles after placing the cap flush with the cap flange; and
H) Threading the bolt to the threaded opening of the elongate member.

* * * * *